Jan. 9, 1923.
J. T. JACKSON,
SIGN,
FILED FEB. 8, 1922.
1,441,856.
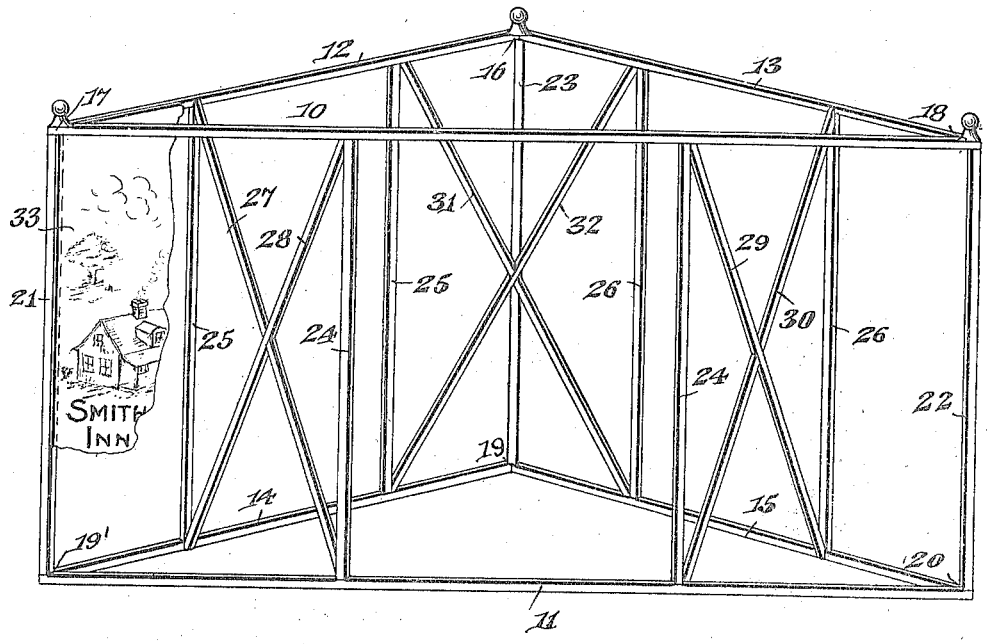
John T. Jackson, INVENTOR.
BY
Geo. P. Kimmel, ATTORNEY.

Patented Jan. 9, 1923.

1,441,856

UNITED STATES PATENT OFFICE.

JOHN T. JACKSON, OF COLDWATER, MICHIGAN.

SIGN.

Application filed February 8, 1922. Serial No. 535,003.

*To all whom it may concern:*

Be it known that I, JOHN T. JACKSON, a citizen of the United States, residing at Coldwater, in the county of Branch and State of Michigan, have invented certain new and useful Improvements in Signs, of which the following is a specification.

This invention relates to frames for supporting display matter such as signs, paintings and the like, more particularly for advertising purposes, and has for one of its objects to provide a device of this character constructed to withstand the force of the wind from all sides and from all directions, and to provide a relatively large area which is equally visible from all sides.

With these and other objects in view, the invention consists in certain novel features of construction as hereinafter shown and described and then specifically pointed out in the claim, and in the drawings illustrative of the preferred embodiment of the invention:—

The figure is a perspective view of the improved device with a portion of a sign supporting body attached.

The improved device comprises an upper longitudinally directed member 10, a lower longitudinally directed member 11, upper angularly directed members 12 and 13, and lower angularly directed members 14 and 15. The angularly directed members 12 and 13 are united at their confronting ends as shown at 16 and also united respectively to the longitudinal member 10 at their other ends, as shown at 17 and 18.

The angularly directed members 14 and 15 are united at their confronting ends as shown at 19 and also united respectively to the longitudinal member 11 at their other ends as shown at 19' and 20. The ends of the members 10 and 11 are connected by vertical members or posts 21 and 22, while the angularly directed members 12 and 13 and the angularly directed members 14 and 15 are connected at their junctures by a post 23.

The members 10 and 11 are also connected by a plurality of intermediate posts 24, the members 12 and 14 connected by intermediate posts 25, while the members 13 and 15 are connected by intermediate posts 26. The longitudinally directed members 10 and 11 and the angularly directed members 12 and 14 are connected by obliquely directed braces 27 and 28, the longitudinally directed members 10 and 11 and the angularly directed members 13 and 15 connected by obliquely directed braces 29 and 30, while the angularly directed members 12 and 13, and 14 and 15 respectively are connected by obliquely directed braces 31 and 32.

The braces 27 and 28 are united to the longitudinally directed members 10 and 11 and the angularly directed members 12 and 14 at their junctures with one set of the post members 24 and 25, the braces 29 and 30 are united to the longitudinally directed members 10 and 11 and the angularly directed members 13 and 15 at their juncture with one set of the vertical post members 24 and 26, and the braces 31 and 32 are connected to the angularly directed members 12 and 14 and 13 and 15 at their junctures with the other set of post members 25 and 26.

The outer faces of the frame will be covered with plates of sheet metal, matched flooring, jointed boards or the like, as indicated at 33, to provide a surface to receive advertising matter.

By this means a very strong and rigid frame is produced which presents a plurality of pointed or V-shaped faces to the wind, rain or snow, and thus divides or "splits" the pressure and materially increases the stability of the structure without material increase of expense.

The members of the frame may be of any suitable material or strength and of any suitable size.

The braces may be "halved" where they cross, or otherwise constructed as required.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

A device of the class described comprising a plurality of oblong frames connected at their ends to define a triangular area, a plurality of vertical stay members connected in spaced relation to the upper and lower members of each of said frames, and obliquely directed braces connected to the upper and lower frame members of two separate frames at the juncture therewith of the vertical stay members.

In testimony whereof, I affix my signature hereto.

JOHN T. JACKSON.